Figure 1:
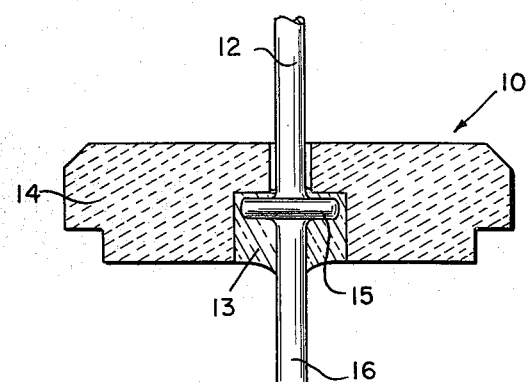

United States Patent [19]
Shoot et al.

[11] 3,906,311
[45] Sept. 16, 1975

[54] METAL-TO-GLASS-TO-CERAMIC SEAL

[75] Inventors: Lyle E. Shoot; John Lambermont, both of Indianapolis, Ind.

[73] Assignee: P. R. Mallory & Co. Inc., Indianapolis, Ind.

[22] Filed: Feb. 27, 1974

[21] Appl. No.: 446,490

[52] U.S. Cl. .............. 317/230; 174/50.61; 313/331
[51] Int. Cl.² ......................................... H01G 9/00
[58] Field of Search.................. 317/230; 174/50.61; 313/331

[56] References Cited
UNITED STATES PATENTS

| | | | |
|---|---|---|---|
| 2,089,044 | 8/1937 | Thomas | 174/50.61 |
| 2,204,217 | 6/1940 | Herriger | 317/230 |
| 3,385,618 | 5/1968 | Hargis | 174/50.61 |
| 3,638,076 | 1/1972 | Koons | 174/50.61 |

*Primary Examiner*—Andrew J. James
*Attorney, Agent, or Firm*—Charles W. Hoffmann; Robert F. Meyer; Donald W. Hanson

[57] ABSTRACT

A metal-to-glass-to-ceramic seal comprising a metal member including elongated portion and enlarged portion, a glass member bonded to the metal member and a ceramic member bonded to the glass member. The ceramic member is in close proximity to part of the elongated portion of the metal member and over the enlarged portion so as to help protect the glass member from stresses resulting from bending of the metal member, to help prevent the metal member from being separated from the seal by an external tensional force, and to direct compressive forces that are parallel to the axis of the metal member such as crimping forces to the metal member rather than exerting shear forces on the glass bonds. Part of the ceramic member of the seal may be metalized with a refractory metal to facilitate the joining of the seal to the device to be sealed. Use of a refractory metal for metalization of the ceramic member imparts several advantages to the seal including replacement of a portion of higher cost noble metals typically used, ability to bond the metal to the ceramic member and fire the ceramic member at the same time, a strong diffusion bond between the ceramic member and the metal layer that is substantially chemically resistant to most common electrolytes used in electrical devices, and ability to fuse a thin noble metal layer to the refractory metal metalized layer which reduces leaching during the joining of the seal to the electrical device.

13 Claims, 3 Drawing Figures

PATENTED SEP 16 1975    3,906,311

METAL-TO-GLASS-TO-CERAMIC SEAL

The present invention relates to seals, and more particularly, to seals of the metal-to-glass-to-ceramic type adapted for use in electrical devices such as liquid or semiliquid containing electrolytic capacitors.

Typical metal-to-glass-to-ceramic seals are disclosed in U.S. Pat. No. 3,638,076 granted to E. R. Koons on Jan. 25, 1972, and assigned to P. R. Mallory & Co. Inc. The seals shown therein provide for hermetic closure of an electrical device that is resistant to many types of corrosive liquids. The seals are characterized by a glass member around the axis of an elongated metal member. The glass member has an annular ceramic ring around it and bonded thereto. A portion of the top surface of the ceramic ring may be metalized to facilitate attachment of the seal to the metal housing of the device to be sealed by means such as soldering, welding or brazing.

The elongated metal portion is generally referred to as a riser and it provides external electrical connection from the internal electrical components of the device. The riser may be composed of any metal but typically is a dielectric oxide film-forming metal such as tantalum, niobium, aluminum, titanium or zirconium.

The materials used in such a seal are chosen so as to provide an approximate match of coefficients of thermal expansion. Such an approximate match allows the device to operate over a wide temperature range without harmfully affecting the seal.

The seal itself is resistant to corrosion when used in an electrical device containing an electrolyte such as an acid, since those members in the seal which come in contact with electrolyte or its vapors, the ceramic member, the glass member and the metal riser are substantially corrosion resistant.

When this type of seal is used in an electrical device, on many occasions the edge of the housing of the electrical device is crimped over the edge of the seal. Such a crimping operation provides a convenient area of attachment between the housing and the seal and also provides compressive force to maintain the electrical components inside the housing in a fixed and stable position. In the case of a porous tantalum anode capacitor, the crimping operation helps to maintain the anode in such a position that it will not be harmfully affected by vibration.

In the crimping operation, the proper amount of compressive force needed to prevent vibration of the electrical components is difficult to accurately control and therefore, in many operations, an excess of compressive force must be used to insure that the electrical components are tightly held within the housing. The excess compressive forces on the edge of the seal created by the crimping operation are then opposed by the metal riser since it is attached to the electrical components in contact with the housing. Such an opposition of the metal riser to the compressive forces creates a bending moment between the edge of the seal and the center. The bending moment creates harmful stresses on the seal, especially shear forces on the glass member and glass bonds since they do not have the mechanical strength that the ceramic member or the metal riser have. These harmful stresses on the seal may cause a fracture in part of the seal which results in the seal being non-hermetic and may allow leakage of the electrolyte from the device and ingress of harmful contaminants into the device. In either situation, the electrical performance of the device is harmfully affected.

In addition, with the metal riser supported entirely by the glass member of the seal, any bending of the external portion of the riser during assembly of the electrical device or during connection of the device to an electrical circuit may create harmful stresses on glass member of the seal since the glass member is in intimate contact with the riser and any bending motion of the riser will tend to be resisted by the glass member. Again fracturing of the glass portion may occur with the resultant loss of electrolyte and the hermetic nature of the seal.

Typically, the ceramic member of the seal is metalized after the ceramic member has been hardened or fired. The metalized layer is usually applied as a paste or a dip coat and then heated to bond the layer to the ceramic member.

In metalization of a portion of the ceramic member, noble metals such as gold, silver and platinum are typically used since these metals are resistant to corrosion from common capacitor electrolytes and provide a strong bonding surface for the joining of the seal to the housing by methods such as soldering, brazing or welding. In most situations, however, it is necessary to employ a binder such as silica glass with the noble metal to insure good bonding of the metalized layer to the ceramic member. Although the resultant bond between the metal layer and the ceramic member has a high mechanical strength, the bond is quite susceptible to attack by common acid electrolytes that are used in electrical devices. Therefore any contact with such electrolytes harmfully affect the bond between the metal layer and ceramic member and may allow leakage of the electrolyte and loss of the hermetic nature of the seal.

In joining of the metalized layer to the crimped edge of the housing by methods such as soldering, brazing or welding, the metalized layer of noble metal is quite susceptible to leaching by the joining material. Thus, a significant amount of the noble metal may be leached by the joining material with a resultant adverse effect on the strength of the bond between the metalized layer and the joining material. Since the thermal coefficient of expansion of the joining material is usually quite different than that of the metalized layer, it is imperative that there be a strong bond between the metalized layer and the joining material so as to insure that the seal for the device remains hermetic during temperature cycling.

One of the other major disadvantages to the above metalization process is the high cost of the noble metals used. With gold, silver and platinum commanding premium prices, even the use of small amounts of noble metal per seal can add significantly to the total cost of the seal.

Another disadvantage is that metalization takes place after the firing of the ceramic since the temperature required to fire ceramic is much greater than the melting point of the noble metals. Therefore extra process steps and greater amounts of heat are required to accomplish metalization as compared with accomplishing both at the same time.

It is, therefore, a feature of the present invention that the amount of high cost noble metals required for metalization of a metal-to-glass-to-ceramic seal is reduced. Another feature is that the seal including the metalized layer is substantially chemically resistant to most electrolytes commonly used in electrical devices. Yet another feature is that the metalized layer is substantially impervious to leaching by the joining material. Another feature of the present invention is that the metalization step may be performed in the same step as the firing of the ceramic member. Another feature of the present invention is that the bond between the metalized layer and the ceramic is strong. Yet another feature is that the seal is designed so as to reduce stresses from compressive forces on the glass member of the seal. Another feature is that stresses on the glass member due to the bending of the elongated metal portion of the metal riser are reduced. Yet another feature is that the structural cooperation between the metal riser and the ceramic member helps to prevent the metal riser from being separated from the seal by an external tensional force.

Figure 2:
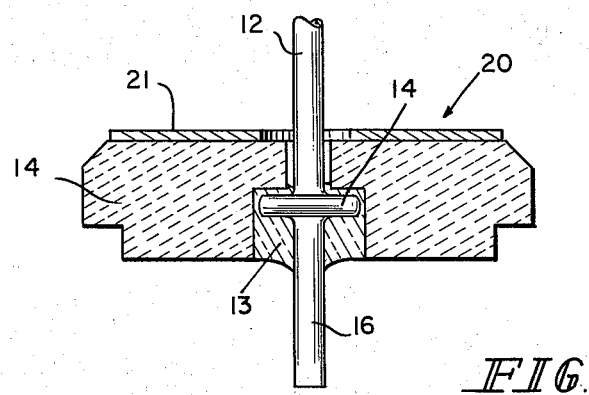
Figure 3:
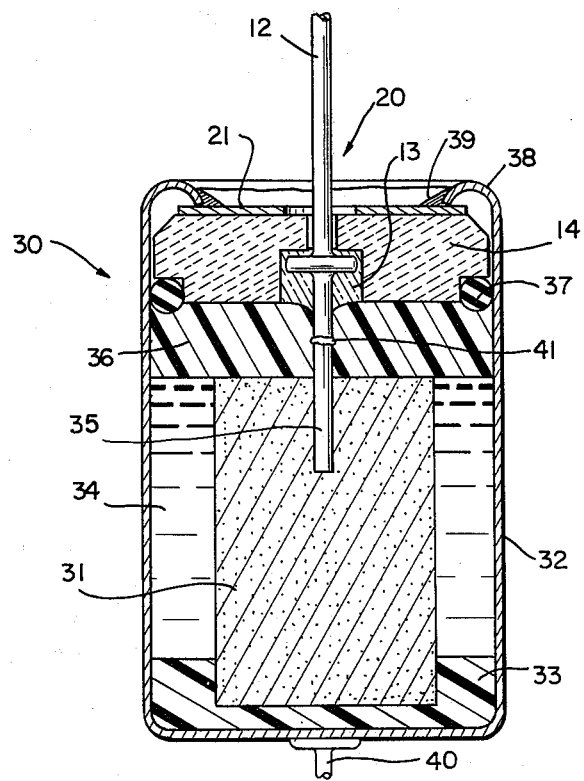

These and other features and advantages will become more apparent from the following description taken in conjunction with the accompanying drawings in which;

FIG. 1 is a sectional view of a metal-to-glass-to-ceramic seal according to this invention, FIG. 2 is a sectional view of another seal according to this invention and, FIG. 3 is a sectional view of a porous anode, electrolytic capacitor employing a seal according to this invention.

Generally, the invention relates to an improved component design for a metal-to-glass-to-ceramic seal with a refractory metal metalized portion to facilitate attachment of the seal to a housing. More specifically, the seal includes the metalized portion including a refractory metal with a thin layer of noble metal over and fused to the metalized portion and an elongated riser having an enlarged portion with part of the ceramic member over part of the enlarged portion of the riser cooperating with a glass member to form a metal-to-glass-to-ceramic seal.

The invention can be more clearly understood when discussed with reference to the drawing. FIG. 1 is a cross-sectional view of a seal 10 including metal riser 12, glass member 13 and ceramic member 14. Metal riser 12 consists of elongated portion 16 with enlarged portion 15 around portion 16 in the shape of a ring. It is to be understood that the enlarged portion 15 may have configurations other than ring-like such as square, rectangular, elliptical and the like. It is preferred that enlarged portion 15 be ring-like. Around the enlarged portion 15 and part of the elongated portion 16 is glass member 13. Glass member 13 is electrically insulative and is resistant to the corrosive effect of most common electrolytes used in electrical devices. Ceramic member 14 in the general shape of an annulus is around the glass member 13 and part of the elongated portion 16 of the metal riser 12. The aperature in the ceramic member 14 has two different diameters, the larger diameter sufficient in size to allow passage of the enlarged portion 15 of the metal riser 12 and the smaller diameter sufficient in size to allow passage of the elongated portion 16 but not the enlarged portion of the metal riser. The ceramic member 14 is bonded to the glass member 13.

Such an arrangement of the components of the seal 10 as shown in FIG. 1 helps to prevent harm to the seal integrity when the riser 12 is subject to a bending action at its uppermost portion by utilizing the greater mechanical strength of the ceramic member 14 to maintain the riser in the proper position. Bending of the riser 12 within the seal volume is contained by the inner walls of the ceramic member 14 so that stresses are minimized upon the glass member 13.

The enlarged portion 15 of the riser 12 helps to prevent the riser from being pulled from the seal 10 by an external tensional force. The enlarged portion 15 also provides a support for the ceramic member 14 when the ceramic member is subject to forces from the top. These compressive forces on the ceramic member 14 are transferred to the enlarged portion 15 of the metal riser 12 and then to the riser itself rather than exerting shear forces on the metal-to-glass or glass-to-ceramic bonds as would be the case in a conventional metal-to-glass-to-ceramic seal.

Riser 12 can be composed of any metal, but for many applications, dielectric oxide film-forming metals such as tantalum, niobium, titanium, aluminum and zirconium are preferred. The riser can be made from two separate pieces joined together such as a wire and an annular ring or the riser can be made by a suitable swaging operation on a metal wire.

In a swaging operation, a metal wire is tightly gripped at both extremities while a compressive force is exerted along the longitudinal axis of the wire and the ends allowed to move closer together, thereby providing an enlarged portion on the wire. The swaging operation is preferred since it is more easily accomplished than fabricating two separate metal pieces and then joining the pieces together.

The glass member 13 may be composed of any glass that is substantially unaffected by the acid or salt used in the device to which the seal is a part. The glass member 13 should have a coefficient of thermal expansion aproximately equal to that of the metal of the riser 12, so as to minimize harm resulting from unequal contraction or expansion during temperature cycling. The coefficient of thermal expansion of the glass of the glass member 13 may be chosen to approximately match that of the metal of riser 12 or may be chosen to be slightly less than that of the riser so as to result in a compression type seal.

Suitable glass for the glass member 13 of the invention may contain a predominant amount of silicon oxide and minor amounts of sodium oxide, potassium oxide, and additional oxides in even smaller amounts including one or more of chromium oxide, manganese oxide, cobalt oxide, lead oxide, calcium oxide and silver oxide. Furthermore, it is apparent that many other glasses either having some or all of the foregoing oxide constituents, which have the necessary properties of a proper coefficient of expansion and resistance to electrolyte corrosion, may be used in the present invention.

The ceramic member 14 must also be resistant to corrosion by the common electrolytes used in electrical devices and have a compatible coefficient of thermal expansion with the glass member 13. While any ceramic having the above properties may be utilized in the invention, a preferred ceramic is one containing a predominant amount of aluminum oxide because a ceramic of this composition is relatively low in cost and has excellent resistance to corrosion by concentrated sulfuric acid, a very common capacitor electrolyte. Such a ceramic would contain at least 80 wt. percent aluminum oxide, the balance other oxide materials including such oxides as silicon dioxide, magnesium oxide, calcium oxide, sodium oxide, potassium oxide, lead oxide etc. The most preferred alumina range is from about 84 wt. percent to about 99.9 wt. percent. Generally, the ceramic member will have greater mechanical strength as the aluminum oxide content is increased.

FIG. 2 is a cross-sectional view of a seal 20 similar to the one shown in FIG. 1 except that a metalization layer 21 is shown in this illustration. The seal 20 has metal riser 12 with glass member 13 around the enlarged portion 15 and part of the elongated portion 16. Ceramic member 14 is around glass portion 13 and around a part of the elongated portion 16 of metal riser 12. Metal layer 21 is bonded to ceramic member 14 to facilitate joining of the seal 20 to a metallic housing of an electrical device (not shown).

The major constituent of the metal layer 21 is a refractory metal such as tungsten, zirconium, molybdenum, titanium, tantalum or mixtures thereof. Of these refractory metals, tungsten is preferred for the metal layer 21 because it has a relatively low cost as compared with other refractory metals, it is compatible with most suitable ceramic materials, is chemically resistant to common electrolytes, and has a high melting point. Thus refractory metal of a much lower cost has replaced a significant portion of the noble metal generally used for metalizing a portion of the ceramic member 14. In addition, the bond between the refractory metal layer and the ceramic is chemically resistant to attack by common electrolytes such as acids used in electrical devices and total seal integrity is maintained even when the seal is in contact with the electrolyte or its vapors.

The refractory metal layer 21 is joined to the ceramic member 14 by applying a refractory metal paste to the ceramic member and then bonding or fusing the refractory metal to the ceramic by heat. The refractory metal paste includes small but significant amounts of a reactive component such as compounds of titanium, chromium or niobium which promote bonding between the refractory metal and the ceramic. The resultant bond between the metal layer 21 and ceramic member 14 is quite strong and is resistant to common electrolytes such as acids that may be used in the electrical device. In the same heating operation the ceramic member 14 may be fired to its final hardness if desired. Thus a ceramic member 14 can be fired and the metal layer 21 joined to it in one operation thereby saving a process step and the heat utilized therein.

One reason refractory metals are used for this metalization method is that they have the required high temperature properties to withstand the elevated temperature needed for the firing of the ceramic member. The melting point temperatures of the refractory metals are above the firing temperature of the ceramic and therefore do not melt during operation. Melting may cause difficulties in containment of the metal while it is in the molten state. Some metal may even vaporize at the temperatures used for firing the ceramic.

In the embodiment above, it is not critical that the metalization occur during the firing of the ceramic. Adequate metalization of the ceramic member can be obtained by application of the metalized layer after firing of the ceramic but in many situations, the bond between the metal layer and the ceramic member may not be as strong as in the method of accomplishing both in the same heating cycle.

The refractory metal layer may be covered by a very thin layer of a noble metal such as gold, silver, platinum or their alloys, to facilitate the joining of the metalized layer to the housing. Typically, the noble metal layer is from about 0.0001 to about 0.001 inches thick. The noble metal layer is fused to the refractory metal layer by the application of heat. By fusing the noble metal layer to the refractory metal layer, leaching by the joining material is substantially reduced and a stronger bond is thereby obtained.

FIG. 3 illustrates the use of a seal of this invention for sealing an electrolytic, tantalum anode capacitor. It should be understood that a capacitor is used for purposes of illustration only and that the use of the seal is not limited to capacitors alone but may be used in any application where a hermetic, corrosion-resistant seal is required.

FIG. 3 is a cross-sectional view of a porous tantalum anode, electrolytic capacitor 30. The capacitor 30 comprises a metal housing or can 32 with tantalum anode 31 positioned in the housing. The anode 31 is kept from contacting the housing 32 by dielectric spacer 33. The housing 32 is partially filled by an electrolyte 34 such as 39% sulfuric acid. Anode 31 has anode connector 35 imbedded within it and is welded at 11 to metal riser 12 of the seal 20. Spacer 36, composed of an inert, non-conductive material such as polytetrafluoroethylene, separates the anode 31 from the seal 20. Elastomeric O-ring 37 provides a compressive seal against the wall of the housing 32 to help prevent the escape of electrolyte 34 past the outer edges of the seal 20, especially during the subsequent joining operation. Seal 20 is the same as shown in FIG. 2 with metal riser 12, glass member 13, ceramic member 14 and metallic layer 21.

The sealing of the capacitor 30 is completed by crimping the edges 38 of the housing 32 over to contact the metalized layer 21 and then soldering, welding or brazing around the crimped edge with joining metal 39 to join the edge 38 of the housing 32 to the metalized layer 21. The outer edge of the ceramic member 14 may be provided with a chamfer so as to reduce stresses on that edge when the housing 32 is crimped over to contact the metalized layer 21 of seal 20. The capacitor 30 is connected electrically to an external circuit by appropriate attachment of the anode riser 12 and of the cathode connection 40.

In the crimping operation, compressive forces are exerted on the edge of the seal 20 in a direction parallel to the axis of the metal riser 12. These forces are transmitted to the ceramic member 14 and then transferred to the metal riser 12 by the lip of the ceramic member on top of the enlarged portion 15 of the metal riser. Thus, forces on the glass member 13 are reduced, especially shear forces on the glass-to-metal bond and the glass-to-ceramic bond. Such a reduction is advantageous since the ceramic member 14 and the metal riser 12 have a higher mechanical strength than the glass bonds or the glass member 13 itself. Thus the seal 20 as a whole is able to withstand greater forces without fracture or failure and the seal is therefore more reliable.

All the materials for the seals of this invention should be chosen so as to approximately match the coefficients of thermal expansion of the materials. Such an approximate match is desirable since the seal is then able to withstand thermal cycling more easily since the materials will expand or contract at approximately the same rate. A mismatch of coefficients may cause fracturing of the seal components when the seal is subjected to wide ranges of temperatures, especially during construction of the seal when the seal is cooled from 1,000°C or more to room temperature. In general, the difference between the coefficients of thermal expansion for the metal riser and the glass member or for the glass member and the ceramic member should not be more than about $15 \times 10^{-7}$ inches per inch per °C.

The following EXAMPLE is illustrative of the composition of the seal members and method of making a seal according to this invention.

EXAMPLE

A green ceramic ring is pressed from particles consisting substantially of aluminum oxide and then fired at about 1400°C. The ceramic ring has the general shape of the ceramic member 14 of FIG. 1. The aperture in the ceramic ring 14 has two different diameters, the larger diameter of the aperture being sufficient in size to allow insertion of the enlarged portion 15 of the metal riser 12 and the smaller diameter of the aperture able to prevent passage of the elongated portion therethrough.

A paste containing tungsten powder and a carrier is prepared and screened onto one side of the ceramic member 14 using a 200 mesh stainless steel screen. The paste is then dried by evaporating off the carrier at about 100°–150°C and then the dried paste is fired at temperatures in excess of 1450°C in a wet atmosphere of nitrogen and hydrogen to yield a ceramic member with a metalized layer 21.

The metal layer 21 of the seal 20 is then coated with a very thin layer of gold approximately 0.0002 in. thick, so as to facilitate soldering, brazing or welding of the metal layer to another metal member. After application, the layer of gold is heat treated so as to fuse it to the refractory metal layer.

After cooling, the metalized ceramic member 14 is inserted upside down into a suitable fixture along with the metal riser 12. The fixture retains the ceramic member in a fixed and spaced relationship relative to the metal riser 12. A glass preform in the shape of an annulus sufficient in volume to fill the space between metal riser 12 and the side wall of the ceramic member 14 is placed in the space. The glass used in the seal contains about 30 wt. percent silicon, about 22 wt. percent sodium, about 4 wt. percent potassium, about 11 wt. percent barium, the remainder oxygen with traces of lead, chromium, lithium, copper and tin.

The fixture containing the metalized ceramic portion 14, metal riser 12 and glass preform is heated to about 1060°C to melt the preform and to render the viscosity of the glass such as to cause the molten glass to flow and when cooled to provide the glass member 13. The glass of glass member 13 bonds to the ceramic member 14 and the metal riser 12 so as to form an integrated metal-to-glass-to-ceramic seal 20.

The finished seal 20 is of the type as illustrated by FIG. 2. The seal 20 is electrically insulative and chemically resistive to corrosion by common electrolytes. The metal layer 21 is fixedly connected to the ceramic portion and the bond between is also chemically resistant to common electrolytes. When the seal is soldered, brazed or welded to a metalic housing a strong bond and a hermetic seal are obtained. Tungsten in the metallic layer 21 has replaced a significant portion of the more expensive noble metal normally used. With the ceramic member 14 in close proximity to the enlarged portion 15 of the metal riser 12, stresses are reduced on the glass bonds, forces are transfered from the ceramic member 14 to the enlarged portion of the metal riser, the metal riser is more difficult to accidentally remove from the seal by an outward force, and bending of the metal riser inside the seal volume is constrained by the ceramic member.

Thus the seal is well suited for a variety of uses, especially for use in liquid or semi-liquid containing electrical devices such as electrolytic capacitors.

The term bond is used in this disclosure to mean the joining of two materials by physical or chemical means into a compact mass or whole.

While the present invention has been described with reference to particular embodiments thereof, it will be understood that numerous modifications may be made by those skilled in the art without actually departing from the spirit and scope of the invention as defined in the appended claims.

We claim:

1. A seal adapted for use in an electrolytic capacitor containing liquid or semi-liquid electrolyte comprising unitary metal terminal means including elongated portion and enlarged portion, ceramic means with an aperture having at least two different diameters on the same axis, one diameter of the aperture being larger than the enlarged portion of the metal means and the other diameter of the aperture smaller than the enlarged portion of the metal means but larger than the diameter of the elongated portion of the metal means, the enlarged portion of the metal means in the one diameter of the aperture of the ceramic means, the elongated portion of the metal means in the other diameter of the aperture of the ceramic means, a metallized layer including a refractory metal and adhering to at least one surface of the ceramic means, a metallic layer over the metalized layer, the layers providing a means for attaching the seal to a housing, and glass means filling spaces between at least the enlarged portion of the metal means and the one diameter of of aperture of the ceramic means to provide the seal.

2. The seal of claim 1 wherein the metal means consists essentially of a film forming metal selected from the group consisting of tantalum (Ta), niobium (Nb), aluminum (Al), and titanium (Ti).

3. The seal of claim 1 wherein the ceramic means includes at least 80 wt. percent $Al_2O_3$.

4. The seal according to claim 2 wherein the metal layer includes tungsten.

5. A seal according to claim 1 wherein the metallized layer including a refractory metal is selected from the group of tungsten (W), molybdenum (Mo), titanium (Ti), tantalum (Ta), zirconium (Zr), and mixtures thereof.

6. The seal of claim 5 wherein the refractory metal is tungsten.

7. The seal of claim 5 wherein the metalized layer has a thin layer of noble metal over it.

8. An electrolytic capacitor comprising housing means with at least one open end, electrical means inside the housing means spaced from the housing means by spacing means, electrolyte inside the housing means contacting the electrical means, and the seal of claim 1 closing one open end of the housing means and with the metal member of the seal in electrical contact with the electrical means.

9. The capacitor of claim 8 wherein the metal member of the seal consists essentially of tantalum (Ta).

10. The capacitor of claim 8 wherein the walls of the housing means around the seal are crimped over and joined to the metalized layer on the seal.

11. The electrolytic capacitor of claim 8 wherein the electrolyte contains sulfuric acid and the electrical means contains a porous tantalum anode.

12. The electrolytic capacitor of claim 8 wherein the metallized layer on the seal includes a refractory metal selected from the group consisting of W, Mo, Ti, Ta, Zr and mixtures thereof.

13. The electrolytic capacitor of claim 12 wherein the metallized layer has a thin layer of noble metal over it.

* * * * *